March 30, 1937.  G. A. MILLER  2,075,741
CRANKSHAFT
Filed Feb. 11, 1935
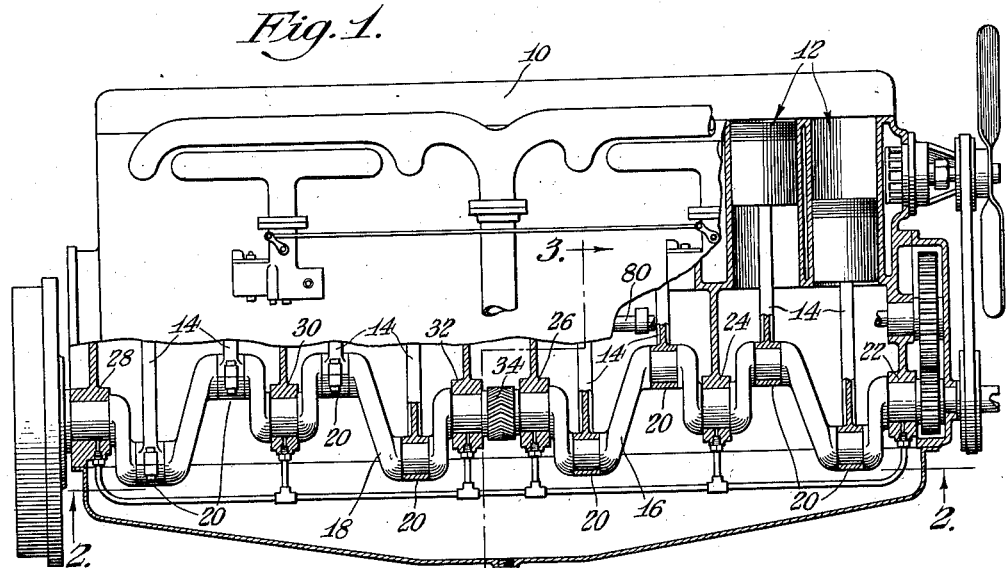
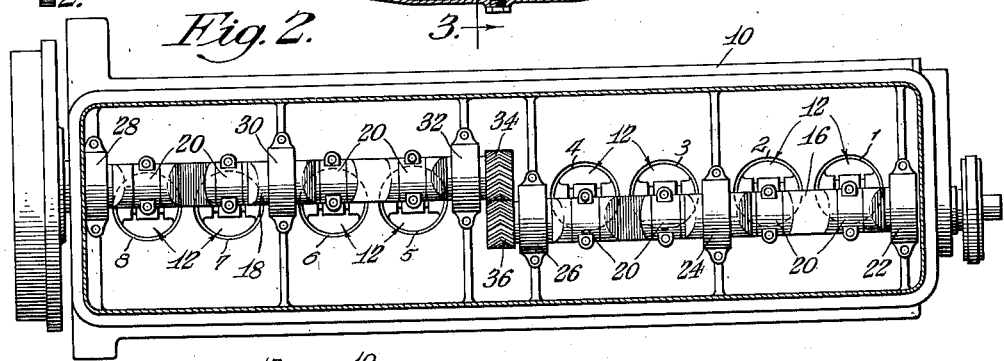
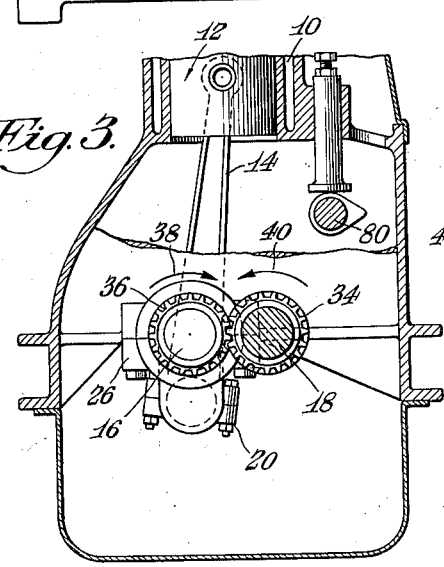
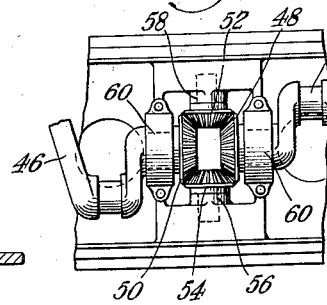
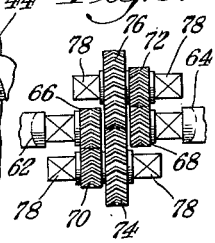
Gustav A. Miller
INVENTOR
BY Victor J. Evans & Co.
HIS ATTORNEYS Patented Mar. 30, 1937

2,075,741

UNITED STATES PATENT OFFICE 2,075,741

CRANKSHAFT

Gustav A. Miller, Bloomington, Ill.

Application February 11, 1935, Serial No. 6,078

2 Claims. (Cl. 121—117)

My invention relates to internal combustion engines, and has among its objects and advantages the provision of an improved crank shaft.

An object of my invention is to provide a crank shaft comprising two parts operatively connected together for rotation in opposite directions at a common R. P. M., whereby torsional vibration imparted to engines of the one-piece crank shaft type is eliminated.

Another object is to arrange the two parts of the shaft in axial alignment or substantially in end to end relation for association with cylinders arranged in a straight line, thereby eliminating the necessity for reconstructing the engine proper.

A further object is to provide a balanced engine eliminating the necessity for special mountings for the engine to secure smooth operation.

In the accompanying drawing:

Fig. 1 is a side elevation of an engine partly in section illustrating my invention;

Fig. 2 is a bottom plan view of the engine with the pan of the crank case removed;

Fig. 3 is a sectional view along the line 3—3 of Fig. 1;

Fig. 4 is a detail view of a different connection between the two crank shaft parts; and Fig. 5 is a view illustrating another type of gear connection between the crank shaft parts.

In the embodiment selected to illustrate my invention, I make use of an internal combustion engine 10 comprising the usual cylinder and piston units 12 and connecting rods 14. My invention comprises a crank shaft made up of two parts 16 and 18 each connected with four of the connecting rods 14 through the medium of conventional bearings 20.

While I have illustrated the invention as being embodied in an eight cylinder engine, it will be understood that the construction is equally applicable to engines made up of a different number of cylinders. In the instant case the crank shaft part 16 is supported by a conventional end bearing 22, a center bearing 24, and an extra end bearing 26. Similarly, the crank shaft part 18 is supported by a conventional end bearing 28, a center bearing 30, and an extra end bearing 32 arranged in close relation with the bearing 26.

I operatively connect the parts 16 and 18 of the crank shaft through the medium of two herringbone gears 34 and 36, respectively. However, spur gears may be used, but it is believed that gears of the herringbone type provide a better connection between the two parts in an engine having the cylinders arranged in a straight line, as illustrated.

The two crank shaft parts 16 and 18 are arranged with their axes of rotation in parallel relation but sufficiently close to accommodate the straight line arrangement of the cylinders. In Fig. 3 I illustrate the axes of rotation of the crank shaft parts 16 and 18 as being arranged on opposite sides of the vertical axes of the cylinders, with the vertical axes passing between the pitch circles of the gears 34 and 36.

With the crank shaft parts 16 and 18 arranged according to the illustration of Fig. 2, the parts rotate in the directions indicated by the arrows 38 and 40 of Fig. 3, so that the connecting rods 14 throw inwardly. Rotation of the part 18 in the direction indicated permits its connection with conventional transmission mechanism. If, however, the parts 16 and 18 were changed so that the part 16 would lie in axial alignment with the position of the part 18, rotation of the parts should be reversed to make a proper connection with the conventional transmission.

In Fig. 4 I have shown a slightly different arrangement of gears for connecting the two crank shaft parts 44 and 46 in axial alignment. In this view the parts 44 and 46 are provided with bevel gears 48 and 50 operatively connected together through the medium of bevel gears 52 and 54. The gears 52 and 54 are supported in bearings 56 and 58 supported by the bearings 60 corresponding to the end bearings 26 and 32. In this arrangement the units 44 and 46 rotate in opposite directions in the same way as the units 16 and 18.

Another form of connection for the crank shaft parts is illustrated in Fig. 5. In this form each crank shaft part 62 and 64 is provided with a gear 66 and 68, respectively, which gears are respectively arranged in mesh with gears 70 and 72. The gear 70 is made in one piece with the gear 74 arranged in mesh with a similar gear 76. The gear 76 is made in one piece with the gear 72. I have indicated diagrammatically at 78 shaft and bearing supports for the gears 70, 72, 74 and 76. Crank shaft parts arranged in axial alignment provide an ideal construction for engines of the V type, in that the arrangement permits the usual close relation between the angularly arranged groups of cylinders.

An engine equipped with my crank shaft may operate in the usual way with respect to the firing order of the cylinders, and the valves may be conventional and operated through the medium of the usual cam shaft 80. In Fig. 2, I have numbered the cylinder and piston units 12 individually from 1 to 8, reading from right to left. The firing order may be conventional as follows: 1, 6, 2, 5, 8, 3, 7, 4. This order is common to most of the present day straight-8 engine designs. In a six cylinder installation according to my invention, and numbering the cylinders from right to left, the firing order could be 1, 5, 3, 6, 2, 4. In any case, the firing order is arranged so that the explosions are alternately distributed between the two parts of the crank shaft, or distributed so far as is possible. I provide a two-piece crank shaft within a single engine and arrange the firing order in such a manner that the forces making for tortional vibration are distributed between the two crank shaft parts. The distribution is such that each force tends to negative the effects of the preceding force so that a balanced condition is attained.

Without further elaboration, the foregoing will so fully explain my invention that others may, by applying current knowledge, readily adapt the same for use under various conditions of service.

I claim:

1. In an internal combustion engine, a plurality of cylinders and pistons arranged in straight alignment, a crank shaft comprising two parts operatively connected together for rotation in opposite directions, said crank shaft parts being arranged in parallel spaced-apart relation, and connections between the pistons and the crank shaft.

2. In an internal combustion engine, a plurality of cylinders and pistons arranged in straight alignment, a crank shaft comprising two parts, a gear connected with each part and meshing with the other gear for rotating the parts in opposite directions at a common R. P. M., the longitudinal axes of the cylinders being aligned in a plane corresponding to the meeting point between the pitch circles of said gears, and connections between said parts and said pistons.

GUSTAV A. MILLER.